United States Patent

[11] 3,594,592

[72] Inventors Vyacheslav Ivanovich Denisko
ulitsa Moskovskaya, 305, kv. 51;
Valery Andreevich Morschakov, ulitsa
Shkolnaya, 14, kv. 24; Eduard Abramovich
Gershenzon, ulitsa Shkolnaya, 14, kv. 24,
all of Riga, U.S.S.R.

[21] Appl. No. 754,590
[22] Filed Aug. 22, 1968
[45] Patented July 20, 1971

[54] A PULSE SHAPER
4 Claims, 4 Drawing Figs.

[52] U.S. Cl. .......... 307/260, 307/242, 307/246, 307/252 K, 307/262, 307/268, 328/57, 328/67
[51] Int. Cl. .......... H03k 5/00
[50] Field of Search .......... 307/246, 260, 261, 262, 252, 268, 284, 293, 305, 252.51, 252.53, 252.72, 242; 328/57, 67, 122

[56] References Cited
UNITED STATES PATENTS

| | | | |
|---|---|---|---|
| 2,429,844 | 10/1947 | Rothman et al. | 328/57 |
| 3,143,729 | 8/1964 | Power | 307/284 X |
| 3,376,472 | 4/1968 | Taylor et al. | 307/284 X |
| 3,391,306 | 7/1968 | Piccione | 307/252 X |
| 3,435,256 | 3/1969 | Young | 328/67 X |

*Primary Examiner*—Stanley D. Miller, Jr.
*Attorney*—Waters, Roditi and Schwartz

ABSTRACT: A pulse shaper for shaping pulses which are time-lagged with respect to each other, including a plurality of shaper circuits, each of the shaper circuits being provided with a charging and a discharging circuit, and a control circuit for alternately energizing the charging and discharging circuit of each shaper and for energizing each of the shapers successively. The discharging circuit of each shaper is connected through a keyed circuit which is supplied with control signals from the control circuit.

A PULSE SHAPER

The present invention relates to bipolar current shapers, which produce timelagged with respect to one another for switching magnetic elements, for instance, ferrods, employed in electronic automatic exchanges, computers and the like.

Prior art shapers of bipolar current pulses comprises a thyristor, a capacitor and a load resistor connected in series. In such shapers discharge resistor, such as a controlled thyristor producing a current pulse, is connected in parallel across the capacitor and load resistor. For obtaining bipolar pulses, timelagged with respect to each other, several shapers are connected to a common selector circuit which controls their successive actuation.

A disadvantage of such a shaper is the requirement for a high-power transistor in each circuit for ensuring the capacitor discharge, which contributes to considerable complexity in the design of the shaper and its high cost.

It is an object of the present invention to simplify the design and reduce the cost of a bipolar current pulse shaper.

It is therefore a specific object of the invention to make and connect the charging and discharging circuits of the shaper so that the discharge of all the circuits can be effected by a single current element.

The above objects are accomplished by providing a shaper of bipolar pulses which comprises several charging and discharging circuits connected to a selector circuit, each of the circuits being provided with a thyristor, a capacitor and a load resistor connected in series with the pulse being produced at the load resistor. According to the invention, each capcitor-discharging circuit incorporates a diode, the diodes of all the circuits being electrically associated with an electronic key connected with the selector that actuates the key during the capacitor discharge time.

Figure 1:
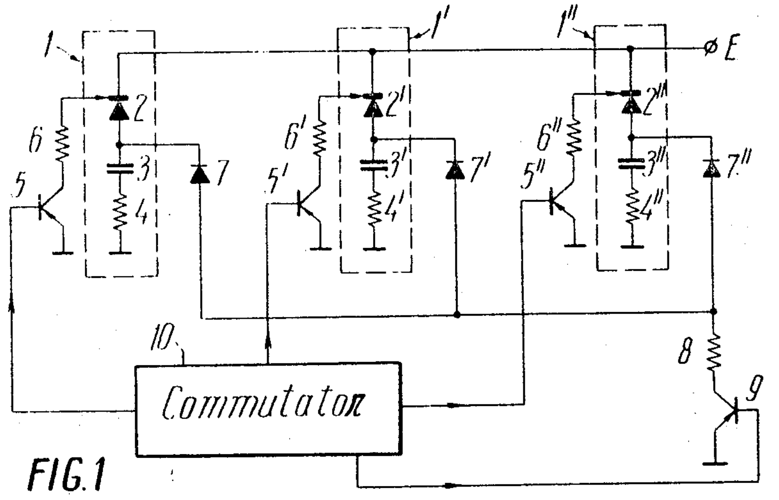
Figures 2, 3, 4:
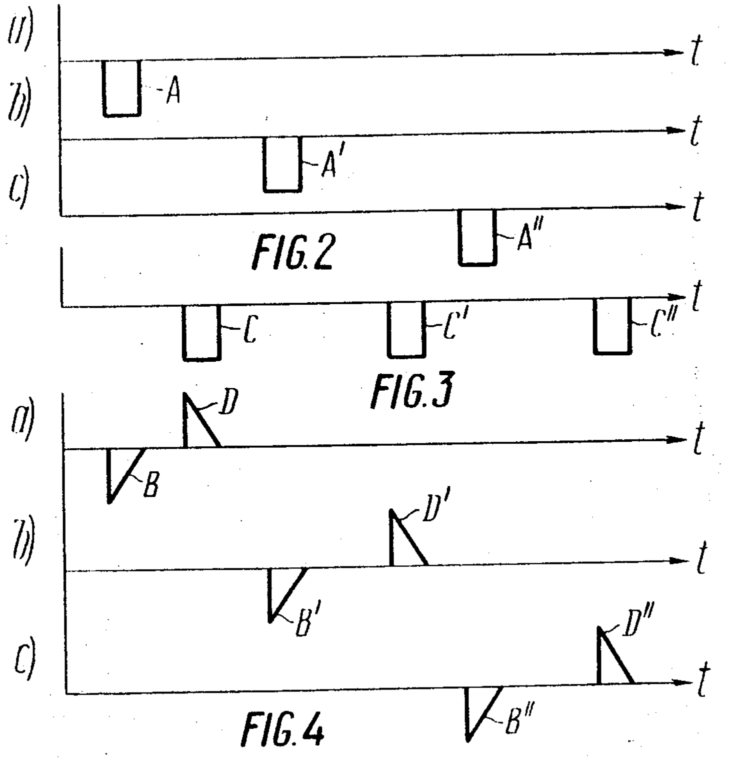

Given hereinbelow is a description of an exemplary embodiment of the present invention to be had in conjunction with the accompanying drawings, in which:

FIG. 1 is a schematic diagram of a bipolar current pulse shaper according to the invention;

FIG. 2 *a,b,c,*graphically represents input pulses of the charging and discharging circuits of the shaper according to the present invention;

FIG. 3 graphically represents input pulses of the electronic key; and

FIG. 4 *a,b,c,*graphically represents bipolar pulses in the loads of the charging and discharging circuits of the shaper.

The shaper of pulses comprises three similar charging circuits 1, 1', 1''(FIG. 1). The circuit 1 comprises a controlled gating device, such as a thyristor 2, a capacitor 3 and a load resistor 4 connected in series.

Connected to the thyristor 2 is a low-power PNP transistor 5 which triggers thyristor 2 and controls its operation. To limit the triggering current of the thyristor 2, the transistor 5 is connected through a resistor 6. The capacitors 3, 3' and 3'' of the charging and discharging circuits 1, 1' and 1'' through diodes 7, 7', 7'' and a resistor 8 are connected to a common transistor key 9. The diodes 7, 7' and 7'', resistor 8 and the transistor key 9 form a common discharging circuit. The outputs of the circuits 1, 1' and 1'' and of the transistor key 9 are connected with a control device 10, for example, a selector circuit which provides control signals for alternately energizing the charging and discharging circuit. The charging circuit includes resistor 4, capacitor 3, and thyristor 2, while the discharging circuit includes resistor 4, capacitor 3, and diode 7 connected through keying circuit 9. In the initial state the transistor 5 and thyristor 2 are cut off. The transistor key 9 is also cut off. When a rectangular pulse (curve A in FIG. 2*a* from the control device 10 is supplied to the input of the transistor 5, the latter starts conducting and triggers the thyristor 2. A negative pulse is shaped in the load resistor 4 (curve B in FIG. 4*a*). The capacitor 3 charges up to the value of the voltages E of the supply source (not shown) and the thyristor 2 becomes cut off.

Then an output pulse (curve C in FIG. 3) is fed from the control device 10 to the input of the transistor key 9 and the latter conducts. The capacitor 3 discharges, and a positive pulse is shaped in the load resistor 4 (curve D in FIG. 4). Thus, after an appropriate capacitor has been charged, the above mentioned selector 10 produces a pulse for opening the electronic key 9, which provides a discharging circuit for this capacitor. The opening of the key 9 also takes place after any other capacitor has been charged to provide conditions for the discharge of the corresponding capacitor.

The remaining circuits of the shaper shape pulses of different polarities in a similar manner. The control device 10 actuates these circuits in succession.

Thus, with the arrival of a pulse (curve A' in FIG. 2*b* the capacitor 3' is charged and a negative pulse is shaped (curve B' in FIG. 4*b*). When a pulse is supplied to key 9 (curve C' in FIG. 3), the capacitor 3' discharges and a positive pulse is shaped (curve D' in FIG. 4).

The employment of the invention proposed herein considerably simplifies the design of the shapers, makes it possible to obtain strong current pulses, with variations in the shape of the pulse edges at the shaper input not significantly influencing the produced pulse across the load.

What we claim is;

1. A pulse shaper for shaping pulses timelagged with respect to each other comprising a plurality of shaper circuits each of said plurality of shaper circuits being provided with a charging circuit and a discharging circuit, said charging circuit including a controlled gating device having a gating input, a resistor and a capacitor connected in series with said controlled gating device, said discharging circuit including said capacitor, said resistor and a diode, one end of each of said diodes of said plurality of shaper circuits being connected together and to a keying circuit, a selector circuit, said selector circuit supplying control signals for alternately energizing said charging and discharging circuits of each of said plurality of shapers, each of said shapers being successively energized, said control signals being directly supplied to each of said shapers for energizing said charging circuit, and to said keying circuit to energize said discharge circuits.

2. A pulse shaper as claimed in claim 1, wherein said keying circuit is provided with a transistor, said transistor being maintained nonconductive, said control signal supplied to said transistor energizing said discharge circuit.

3. A pulse shaper as claimed in claim 2, wherein said gating device is a thyristor.

4. A pulse shaper as claimed in claim 3, wherein said control signal to energize each of said shapers is supplied through a transistor amplifier, having an output, the output of said transistor amplifier triggering said gating device to energize said charging circuit.